G. M. VON HASSEL.
TREE TAPPING APPARATUS.
APPLICATION FILED SEPT. 5, 1912.
1,070,339.
Patented Aug. 12, 1913.
2 SHEETS—SHEET 2.
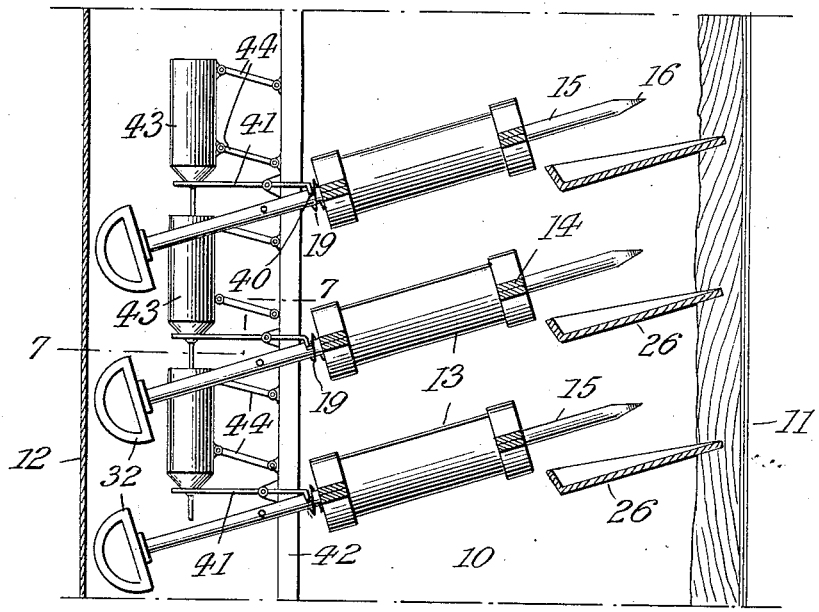
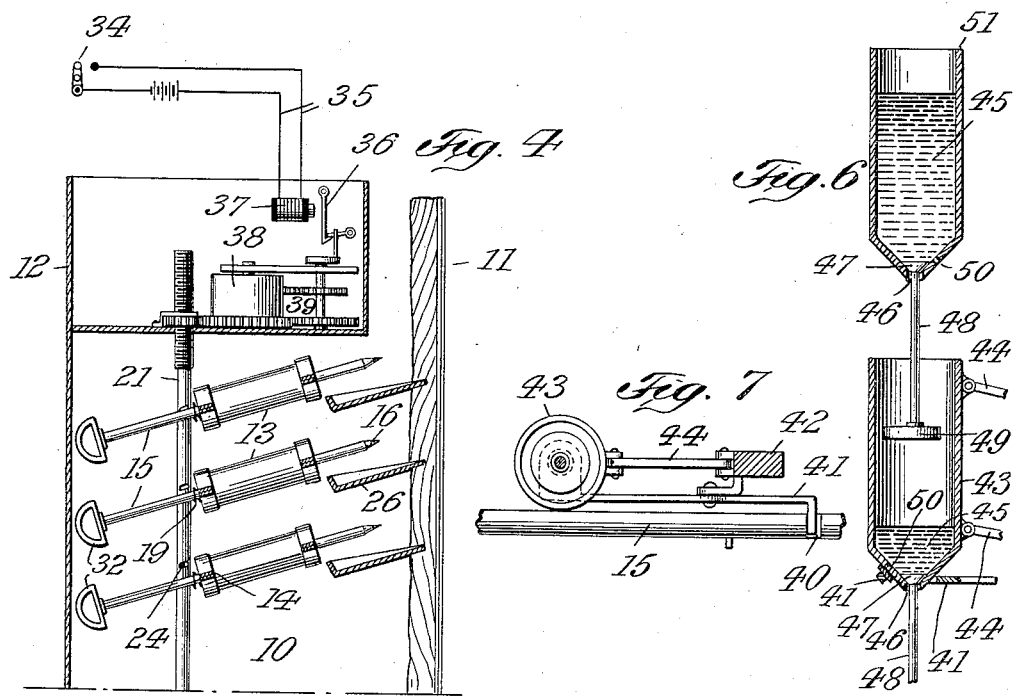

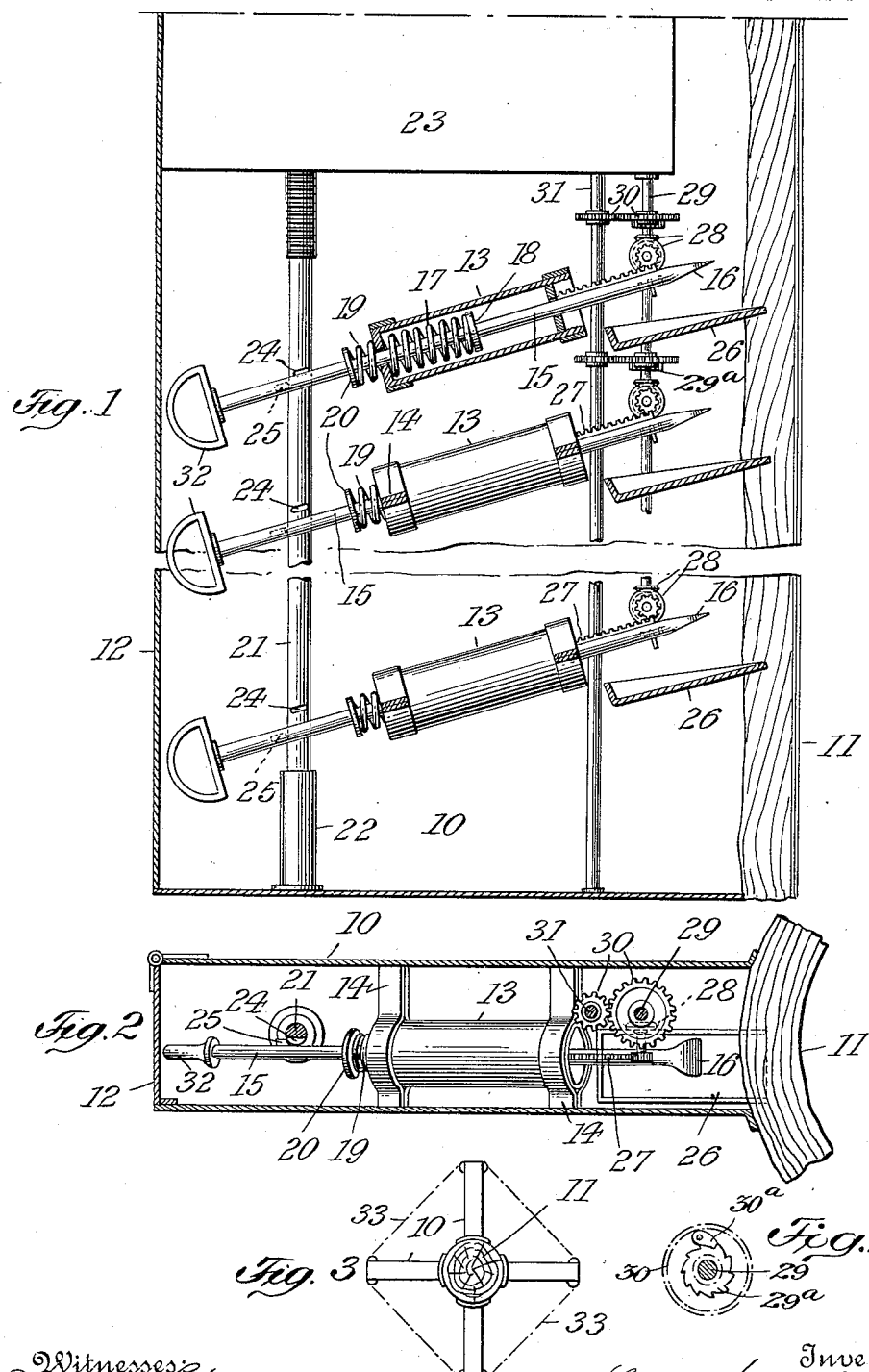

UNITED STATES PATENT OFFICE.

GEORG M. von HASSEL, OF NEW YORK, N. Y.

TREE-TAPPING APPARATUS.

1,070,339.  Specification of Letters Patent.  Patented Aug. 12, 1913.

Application filed September 5, 1912. Serial No. 718,659.

*To all whom it may concern:*

Be it known that I, GEORG M. VON HASSEL, a citizen of Germany, residing at New York city, county and State of New York, have invented a new and Improved Tree-Tapping Apparatus, of which the following is a specification.

This invention relates to an apparatus more particularly intended for tapping rubber trees, though it may also be used for drawing the sap from trees of a different character. By my invention, a plurality of tapping tools are consecutively driven into the bark in an automatic manner to produce the wounds desired. In this way labor is saved and furthermore the lapse of the proper intervals between the successive taps is insured, so that the health of the tree is not liable to suffer.

In the accompanying drawing: Figure 1 is a vertical longitudinal section partly in side view of a tapping apparatus embodying my invention; Fig. 2 a horizontal section; Fig. 2ª a detail of the ratchet mechanism. Fig. 3 a diagram showing the mode of securing a plurality of tapping devices to a tree; Fig. 4 a vertical longitudinal section of a modification of the apparatus; Fig. 5 a similar section of a further modification; Fig. 6 a detail of the mercury cups shown in Fig. 5, and Fig. 7 an enlarged cross section on line 7—7, Fig. 5.

Referring more particularly to Figs. 1–3, the device comprises a frame or casing 10 which is open at the front to face the tree 11 to be tapped and is provided with a hinged back 12. Within casing 10, there is housed a plurality of spaced cylinders 13 arranged below one another and secured in an inclined position to the side walls of the casing by means of bent straps 14. Within each cylinder is free to play the shaft or plunger 15 of a suitable tapping tool 16 which is preferably made in the form of a chisel or cutting blade and is adapted to cut through the bark of tree 11. Each shaft 15 is subjected to the action of a strong advancing spring 17 accommodated within cylinder 13 and bearing against a collar 18 of the shaft. The latter is further encompassed by a cushion or recoil spring 19 located back of cylinder 13 and engaging a disk 20 slidable on the shaft.

Means are provided for holding shafts 15 in their retracted position and for consecutively releasing such holding means so that the tapping tools are driven by springs 17 into the tree at equal fixed intervals of say 48 hours. These holding means comprise an upright rod or keeper 21 stepped into casing 10 at 22 and slowly lowered by a clock work 23. Rod 21 is provided with a number of transverse grooves 24 adapted to become successively alined with lugs 25 of shafts 15. The correlation of the parts is such that one of the grooves 24 is located above each of the shafts 15 and that the distances between the several grooves and shafts increase in arithmetical proportion. Thus, while one unit normally separates the top groove from the top shaft, two units separate the second groove from the second shaft, three units separate the third groove from the third shaft, etc. The axial movement of rod 21 is so timed that it will be lowered for the distance of one unit in a time corresponding to one tapping interval. Thus the top groove will be lowered into alinement with the top shaft in one interval say of 2 days, the second groove will be lowered into alinement with the second shaft in two intervals say of 4 days, etc. As each groove becomes alined with the lug 25 of its shaft, such shaft will be released, so that the chisels 16 are successively driven into the tree by their springs 17 as will be readily understood. Upon the advance of any one shaft, its recoil spring 19 will be compressed by lug 25, so that at the cessation of the advancing movement, the tapping tool will become slightly withdrawn from the wood to permit the sap to freely escape from the bleed hole and collect in a pan 26 driven into the bark beneath the tool.

Means are provided for automatically winding up the clock work by the advance of the successive shafts 15. These means comprise a rack 27 carried by the forward end of each shaft 15 and intergeared by miter wheels 28 with a common counter shaft 29 which in turn by wheels 30 is intergeared with the winding shaft 31 of the clock work. Thus by the advancing movement of the shafts 15, the clock work will be wound up while the retracting movement of the shafts will not be transmitted to the latter, owing to suitable intervening ratchet mechanism, interposed between each of the wheels 30 and shaft 29. This mechanism comprises a plurality of ratchet wheels 29ª fast on shaft 29 and engaged by pawls 30ª pivoted to wheels 30.

To start the apparatus, the clock work is wound up and all the shafts 15 are retracted by handles 32 fixed to the ends of said shafts, the latter being held in their retracted position by means of lugs 25 abutting against rod 21. As the latter descends, the shafts will be successively released in the manner previously described to bleed the tree at the predetermined intervals and to simultaneously wind up the clock work, so that the operation of the apparatus is automatic.

In Fig. 3 is illustrated how a number of my improved apparatus are fitted against different sides of a tree 11 and secured thereto by chains 33.

Fig. 4 shows a further embodiment of my invention in which the successive shafts 15 are adapted to be manually released consecutively from a central station. By this construction, an operator is enabled to drive the tapping tools simultaneously into a large number of trees at suitable intervals. Here a central switch 34 operates a number of electric circuits 35 to attract the armatures 36 of electromagnets 37, each of which is by a catch adapted to release the spring barrel 38 of a clock work 39 pertaining to the tapping apparatus of a single tree. Clock work 39 when released imparts a rapid movement to rod 21 so that by closing switch 34, corresponding tapping tools of all the devices in circuit will be simultaneously advanced. Thus by operating the switch, say once in every 48 hours, all the trees will be evenly tapped at the prescribed intervals.

In Figs. 5–7 a further modification is illustrated in which the clock work is replaced by cups operating on the principle of an hour glass. Each shaft 15 has a notch 40 which is engaged by the bent forward end of a lever 41 fulcrumed to a fixed support 42. Upon the rear end of each lever 40 rests a cup 43 movably connected to support 42 by links 44 and adapted to contain mercury, sand or a similar easily flowing medium 45. Each cup 43 has a lower discharge orifice 46 adapted to be closed by the headed upper end 47 of a rod 48 that carries a float 49 movable in the cup next below. Cup 43 is further provided with a lower by-pass 50 which is adapted to be closed by lever 41.

In operation, the mercury 45 will initially flow from a stationary upper cup 51 through its by-pass 50 into the lower cup 43, the main discharge orifice 46 of the upper cup being closed by head 47. After a certain quantity of mercury has thus been discharged, it will rise to such a level in the lower cup as to lift float 49 and to thus open orifices 46 of the upper cup. In this way the balance of the mercury will be rapidly discharged from the upper cup into the lower cup, so that the weight of the latter will be suddenly increased to tilt its lever 41 and thus cause the latter to release shaft 15. By the tilting movement of lever 41, the by-pass of such lower cup is opened, so that the operation described will be repeated for the cup next below.

I claim:

1. A device of the character described, comprising a plurality of tapping tools adapted to enter a tree, and means for consecutively advancing said tools.

2. A device of the character described, comprising a plurality of spring-influenced tapping tools adapted to enter a tree, means for holding said tools in a retracted position, and means for consecutively releasing said holding means.

3. A device of the character described, comprising a plurality of spring-influenced tapping tools adapted to enter a tree, means for consecutively advancing the tools, and pans beneath the tools.

4. A device of the character described, comprising a plurality of spring-influenced tapping tools adapted to enter a tree, shafts carrying said tools, means for locking said shafts, and means for consecutively releasing said shafts.

5. A device of the character described, comprising a plurality of spring-influenced tapping tools adapted to enter a tree, shafts carrying said tools, a keeper, locking means intermediate said shafts and keeper, and means for actuating said keeper to consecutively release said locking means.

6. A device of the character described, comprising a plurality of spring-influenced tapping tools adapted to enter a tree, shafts carrying said tools, a keeper, locking means intermediate said shafts and keeper, means for consecutively releasing said locking means, and recoil springs carried by the shafts.

7. A device of the character described, comprising a plurality of tapping tools, means for consecutively advancing said tools into a tree to form bleed holes, and automatic means for partly retracting said tools within said holes.

8. A device of the character described, comprising a frame, means for securing said frame to a tree, a plurality of tapping tools carried by the frame, and means for consecutively advancing said tools into the tree.

9. A device of the character described, comprising a frame, a plurality of cylinders mounted therein, spring-influenced shafts engaging the cylinders, tapping tools carried by the shafts, means for retracting the shafts, and means for releasing the shafts.

10. A device of the character described, comprising a frame, a plurality of cylinders mounted therein, spring-influenced shafts engaging the cylinders, tapping tools carried by the shafts, a rod stepped into the frame, means for lowering the rod, and locking means intermediate shafts and rod.

GEORG M. von HASSEL.

Witnesses:
 FRANK V. BRIESEN,
 KATHERYNE KOCH.

Copies of this patent may be obtained for five cents each, by addressing the "Commissioner of Patents, Washington, D. C."